(12) United States Patent
Pilote et al.

(10) Patent No.: US 9,175,907 B2
(45) Date of Patent: Nov. 3, 2015

(54) DIRECT SMELTING PROCESS AND APPARATUS

(75) Inventors: Jacques Pilote, Woodlands (AU); Rodney James Dry, City Beach (AU)

(73) Assignee: Technological Resources Pty. Limited, Melbourne, Victoria (AU)

(*) Notice: Subject to any disclaimer, the term of this patent is extended or adjusted under 35 U.S.C. 154(b) by 1006 days.

(21) Appl. No.: 13/148,576

(22) PCT Filed: Feb. 9, 2010

(86) PCT No.: PCT/AU2010/000131
§ 371 (c)(1),
(2), (4) Date: Dec. 13, 2011

(87) PCT Pub. No.: WO2010/088740
PCT Pub. Date: Aug. 12, 2010

(65) Prior Publication Data
US 2012/0067171 A1 Mar. 22, 2012

(30) Foreign Application Priority Data

Feb. 9, 2009 (AU) .............................. 2009900490

(51) Int. Cl.
*C21B 13/00* (2006.01)
*F27B 3/10* (2006.01)
(Continued)

(52) U.S. Cl.
CPC ............... *F27B 3/10* (2013.01); *C21B 13/0013* (2013.01); *C21B 13/0026* (2013.01); *F27B 3/18* (2013.01); *F27B 3/22* (2013.01); *F27D 3/16* (2013.01); *F27D 3/18* (2013.01)

(58) Field of Classification Search
CPC .... C21C 5/4606; C21C 5/567; C21C 5/4613; C21C 5/32; C21C 5/466; C21C 5/35; C21C 5/4646; C21C 2005/4626; C21C 7/0037; F27D 3/18; F27D 3/16; F27D 3/1518; F27D 2003/168; F27D 1/12; F27D 9/00; F27B 3/22; F27B 3/225; F27B 3/18
USPC ............................ 266/171, 267, 268; 75/503
See application file for complete search history.

(56) References Cited

U.S. PATENT DOCUMENTS 5,374,297 A    12/1994   Schlichting
6,322,745 B1 * 11/2001   Leigh et al. ..................... 266/44
(Continued)

FOREIGN PATENT DOCUMENTS

WO     WO 2007121531 A1 *  11/2007

OTHER PUBLICATIONS

International Search Report from the Australian Patent Office for International Application No. PCT/AU2010/000131, mailed Mar. 10, 2010.

(Continued)

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A process and apparatus for direct smelting metalliferous material is disclosed. The invention concentrates injection of solid feed materials comprising metalliferous material and carbonaceous material into a direct smelting vessel during the course of the process into a relatively small region within a metal layer in a molten bath in the vessel in order to generate a substantial upward movement of molten material and gas from the metal layer into a region in the vessel that is above the molten bath. In particular, the invention injects the solid feed materials with sufficient momentum and/or velocity via an opposed pair of lances that are oriented within the vessel and arranged to form overlapping plumes of injected material in the molten bath.

15 Claims, 3 Drawing Sheets

(51) Int. Cl.
*F27B 3/18* (2006.01)
*F27B 3/22* (2006.01)
*F27D 3/16* (2006.01)
*F27D 3/18* (2006.01)

(56) References Cited

U.S. PATENT DOCUMENTS

| | | | |
|---|---|---|---|
| 6,379,424 B1* | 4/2002 | Dry | 75/500 |
| 2004/0031355 A1* | 2/2004 | Dry et al. | 75/502 |
| 2007/0194505 A1 | 8/2007 | Dry et al. | |
| 2008/0302213 A1* | 12/2008 | Gurr | 75/707 |

OTHER PUBLICATIONS

Burke, P. D. et al., "HIsmelt—The Alternative Ironmaking Technology," Smelting Reduction for Ironmaking, Bhubaneswar, Retrieved from the Internet, <URL:http://www.hismelt.com/EN/Documents/TechnicalPapers/2002_12_bhubaneswar_burke_gull.pdf> pp. 1-6, (2002).

* cited by examiner

DIRECT SMELTING PROCESS AND APPARATUS

CROSS REFERENCE TO RELATED APPLICATION

This application is a national phase application based on PCT/AU2010/000131, filed Feb. 9, 2010, which claims the priority of Australian Patent Application No. 2009900490, filed Feb. 9, 2009, the content of both of which is incorporated herein by reference.

FIELD OF THE INVENTION

The present invention relates to a process and an apparatus for direct smelting a metalliferous material. The present invention also relates to a direct smelting plant.

BACKGROUND

A known direct smelting process for a metalliferous material, which relies principally on a molten bath as a smelting medium, and is generally referred to as the HIsmelt process, is described in International application PCT/AU96/00197 (WO 96/31627) in the name of the applicant.

The HIsmelt process as described in the International application in the context of direct smelting a metalliferous material in the form of iron oxides and producing molten iron includes the steps of:
 (a) forming a bath of molten iron and slag in a vessel;
 (b) injecting into the bath: (i) metalliferous material, typically iron oxides; and (ii) solid carbonaceous material, typically coal, which acts as a reductant of the iron oxides and a source of energy; and
 (c) smelting metalliferous material to iron in the molten bath.

The term "smelting" is herein understood to mean thermal processing wherein chemical reactions that reduce metal oxides take place to produce molten metal.

The HIsmelt process also includes post-combusting reaction gases, such as CO and $H_2$ released from the bath, in the space above the bath with oxygen-containing gas, typically air, and transferring the heat generated by the post-combustion to the bath to contribute to the thermal energy required to smelt the metalliferous materials.

The HIsmelt process also includes forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process metalliferous material and solid carbonaceous material are injected into a molten bath through a number of solids injection lances (sometimes referred to as "tuyeres") which are inclined to the vertical so as to extend downwardly and inwardly through a side wall of a direct smelting vessel and into a lower region of the vessel so as to deliver at least part of the solids material into a molten metal layer in the bottom of the vessel. To promote the post-combustion of reaction gases in an upper part of the vessel, a blast of hot air, which may be oxygen-enriched, is injected into an upper region of the vessel through a downwardly extending hot air injection lance. Off gases resulting from post-combustion of reaction gases in the vessel are taken away from the upper region of the vessel through an off gas duct. The vessel includes refractory-lined water cooled panels in the side wall and the roof of the vessel, and water is circulated continuously through the panels in a continuous circuit.

The HIsmelt process enables large quantities of molten iron to be produced by direct smelting of metalliferous material. To enable such levels of production, large quantities of both metalliferous material and carbonaceous material must be supplied to the vessel.

The above description is not to be taken as an admission of the common general knowledge in Australia or elsewhere.

SUMMARY OF THE INVENTION

The present invention provides an effective process and apparatus for direct smelting metalliferous material. In particular, the present invention concentrates injection of solid feed materials comprising metalliferous material and carbonaceous material into a direct smelting vessel during the course of the process into a relatively small region within a metal layer in a molten bath in the vessel in order to generate a substantial upward movement of molten material and gas from the metal layer into a region in the vessel that is above the molten bath. In particular, the invention injects the solid feed materials with sufficient momentum and/or velocity via an opposed pair of lances that are oriented within the vessel and arranged to form overlapping plumes of injected material in the molten bath.

The present invention provides a molten bath-based process for direct smelting metalliferous material, such as in the form of iron oxides, and producing molten metal in a direct smelting vessel, which process comprises injecting a solid metalliferous material and a solid carbonaceous material through at least one pair of opposed injection lances extending downwardly and inwardly into a molten bath in the direct smelting vessel with longitudinal axes of the lances in the pair of opposed lances intersecting at a floor of the vessel or above the floor or below the floor whereby plumes of injected material from the lances overlap in a central region of a metal layer in the molten bath and the metalliferous material at least substantially melts in the metal layer and there is upward movement of molten material and gas from the central region of the metal layer.

The term "plumes of injected material" is understood herein to describe the streams of (a) injected metalliferous material and carbonaceous material and (b) products produced as a result of such injection into the direct smelting vessel via the lances. The products include, by way of example, volatiles released from the carbonaceous material and reaction products such as CO and CO2 and H2O.

Preferably the longitudinal axes of the lances intersect above the vessel floor.

The longitudinal axes of the lances may intersect within a top three quarters of the metal layer in the molten bath, as measured from the vessel floor. In other words, the longitudinal axes of the lances do not intersect in the first quarter of the metal layer above the vessel floor. Consequently, the injected material from the lances reacts in this upper three quarters of the metal layer. In effect, the first quarter of the metal layer acts as a cushion between the floor and the overlapping plumes.

The longitudinal axes of the lances may intersect within a top one half of the metal layer in the molten bath, as measured from the vessel floor.

The lances may extend through a side wall of the vessel.

The process may comprise selecting the momentum and/or the velocity of the injected material to penetrate the molten bath to the central region of the metal layer.

The metalliferous material and the carbonaceous material may be pneumatically injected into the smelting vessel whereby the material is entrained in a carrier gas.

The process may melt at least 75% by weight of the metalliferous material injected via the lances before this material passes into a slag region of the molten bath.

The process may melt at least 90% by weight of the metalliferous material injected via the lances before this material passes into the slag region of the molten bath.

At least 75% by weight of the metalliferous material and the carbonaceous material that is supplied to the direct smelting vessel during the process may be injected into the vessel via the lances.

The process may operate at above atmospheric pressure.

The process may operate in a range of pressures between 0.5 barg and 1.2 barg, and preferably between 0.6 to 1.0 barg.

The process may comprise injecting hot metalliferous material via the lances.

When the metalliferous material is iron ore, the process may comprise injecting the iron ore at a temperature of at least 500° C. via the lances.

The process may comprise injecting the metalliferous material and the carbonaceous material from the lances towards a vertical centreline of the direct smelting vessel.

The upward movement of molten material and gas from the metal layer may extend into an upper region of the vessel which is a gas space of the vessel.

The upward movement of molten material and gas from the metal layer into the upper region of the vessel may be sufficient to wet water-cooled panels that form a side wall and optionally a roof of the direct smelting vessel to an extent that heat loss through the panels is less than 3000 kW/m$^2$ of panel and preferably less than 2000 kW/m$^2$ of panel.

In addition, the upward movement of molten material and gas from the metal layer into the upper region of the vessel may be sufficient to cause substantial agitation in the molten bath and facilitate heat transfer from the upper region into the molten bath.

The process may further comprise injecting the carbonaceous material through at least one additional lance into the direct smelting vessel during the process. Injection of carbonaceous material through this lance may not be required during normal operating conditions of the process and may be required for example only during start up or in situations where there are perturbations in the process.

The vessel may be an enclosed vessel with a roof, a hearth region in a base of the vessel for containing the molten bath, and a gaseous region between the molten bath and the roof.

The metalliferous material may be iron ore, such as iron ore fines.

The carbonaceous material may be coal.

The process may comprise injecting at least 100 tonnes/hour iron ore and at least 60 tonnes/hour coal into the direct smelting vessel and producing at least 60 tonnes/hour molten iron.

The present invention also provides a molten bath-based process for direct smelting metalliferous material, such as in the form of iron oxides, and producing molten metal in a direct smelting vessel, which process comprises pneumatically injecting a solid metalliferous material and a solid carbonaceous material through at least one pair of opposed injection lances extending downwardly and inwardly into a molten bath in the direct smelting vessel whereby plumes of pneumatically injected material from the lances coalesce in the molten bath below a nominal interface of molten metal and molten slag under quiescent conditions, thereby producing significant upward movement of molten material and gas from a metal layer of the molten bath.

The lances may be oriented within the vessel so that longitudinal axes of the lances intersect a floor of the vessel or above the floor or below the floor.

Preferably the longitudinal axes of the lances intersect above the vessel floor.

The longitudinal axes of the lances may intersect within a top three quarters of the metal layer in the molten bath, as measured from the vessel floor. Consequently, the injected material from the lances coalesces in this upper three quarters of the metal layer. In effect, this first quarter of the metal layer acts as a cushion between the floor and the overlapping plumes.

The longitudinal axes of the lances may intersect within a top one half of the metal layer in the molten bath, as measured from the vessel floor.

The process may comprise selecting the momentum and/or the velocity of the injected material to penetrate the molten bath and coalesce in the molten bath below the nominal interface of molten metal and molten slag under quiescent conditions and thereby produce the significant upward movement of molten material and gas from the metal layer of the molten bath.

The sufficient momentum of the injected material may be the average momentum of gas and/or metalliferous material and/or carbonaceous material forming the plumes.

The average momentum of the metalliferous material may be based on the mean particle diameter of the metalliferous material.

The average momentum of the carbonaceous material may be based on the mean particle diameter of the carbonaceous material.

The sufficient momentum and/or sufficient velocity may be the momentum or velocity of particles of metalliferous material within the plumes.

The sufficient momentum and/or sufficient velocity may be the average momentum or average velocity of particles of metalliferous material within the plumes.

The sufficient momentum and/or sufficient velocity may be the momentum or velocity of particles of carbonaceous material within the plumes.

The sufficient momentum and/or sufficient velocity may be the average momentum or average velocity of particles of carbonaceous material within the plumes.

The process may operate at above atmospheric pressure.

The process may operate in a range of pressures between 0.5 barg and 1.2 barg, and preferably between 0.6 to 1.0 barg.

The upward movement of molten material and gas from the metal layer may extend into an upper region of the vessel which is a gas space of the vessel.

The upward movement of molten material and gas from the metal layer into the upper region of the vessel may be sufficient to wet water-cooled panels that form a side wall and optionally a roof of the direct smelting vessel to an extent that heat loss through the panels is less than 3000 kW/m$^2$ of panel and preferably less than 2000 kW/m$^2$ of panel.

In addition, the upward movement of molten material and gas from the metal layer into the upper region of the vessel may be sufficient to cause substantial agitation in the molten bath and facilitate heat transfer from the upper region into the molten bath.

The present invention also provides a direct smelting apparatus for direct smelting metalliferous material, such as in the form of iron oxides, and producing molten metal that comprises:

(a) a direct smelting vessel for containing a molten bath that comprises (i) at least one pair of opposed lances for injecting a solid metalliferous material and a solid carbonaceous material into the vessel during a direct smelting process with longitudinal axes of the lances in the pair of opposed lances intersecting at a floor of the vessel or above the floor or below the floor whereby and (ii) at least one additional lance for injecting a solid carbonaceous material into the vessel during start-up of the process, and (b) a material supply apparatus for supplying solid metalliferous material and solid carbonaceous material to the pair of lances.

Preferably the longitudinal axes of the opposed lances intersect above the vessel floor.

The longitudinal axes of the opposed lances may intersect within a top three quarters of the metal layer in the molten bath, as measured from the vessel floor. In other words, the longitudinal axes of the lances do not intersect in the first quarter of the metal layer above the vessel floor. Consequently, the injected material from the lances reacts in this upper three quarters of the metal layer. In effect, the first quarter of the metal layer acts as a cushion between the floor and the overlapping plumes.

The longitudinal axes of the opposed lances may intersect within a top one half of the metal layer in the molten bath, as measured from the vessel floor.

The opposed lances extend through a side wall of the vessel.

The material supply apparatus for the pair of lances may comprise:

(i) a first solids supply line for transporting heated solid metalliferous material from a dispensing/metering unit to an inlet end of at least one lance of the pair; and (ii) an assembly for supplying solid carbonaceous material from a dispensing/metering unit directly into the said lance or to the first solids supply line downstream of the ore dispensing/metering unit so that there can be co-injection of heated metalliferous material and carbonaceous material from the lance into the vessel.

The vessel may have a minimum diameter of 5 m in a hearth region of the vessel.

The vessel may have a minimum diameter of 6 m in the hearth region of the vessel.

Each lance in the pair of lances may be at an angle of less than 50° to the vertical.

The additional lance for injecting carbonaceous material during process start-up may be at an angle of at least 50° to the vertical.

There are a number of factors that are relevant to the location of the assembly for supplying solid carbonaceous material. Relevant factors include tar formation that could block the line and unwanted premature reactions between heated metalliferous material and carbonaceous material prior to the material entering the vessel.

There is a more detailed description of the material supply apparatus in International application PCT/AU2009/001221 lodged on 16 Sep. 2009 in the name of the applicant and the disclosure in the specification of the application is incorporated herein by cross-reference.

The present invention also provides a direct smelting plant that comprises:

(a) the above-described direct smelting vessel;
(b) a pre-treatment unit, such as a pre-heater, for heating a solid metalliferous material;
(c) a dispensing/metering unit for heated metalliferous material;
(d) a dispensing/metering unit for a solid carbonaceous material; and
(e) the above-described material supply apparatus.

BRIEF DESCRIPTION OF THE DRAWINGS

The present invention is described further by way of example only with reference to the accompanying drawings, of which.

DETAILED DESCRIPTION

Figure 1:
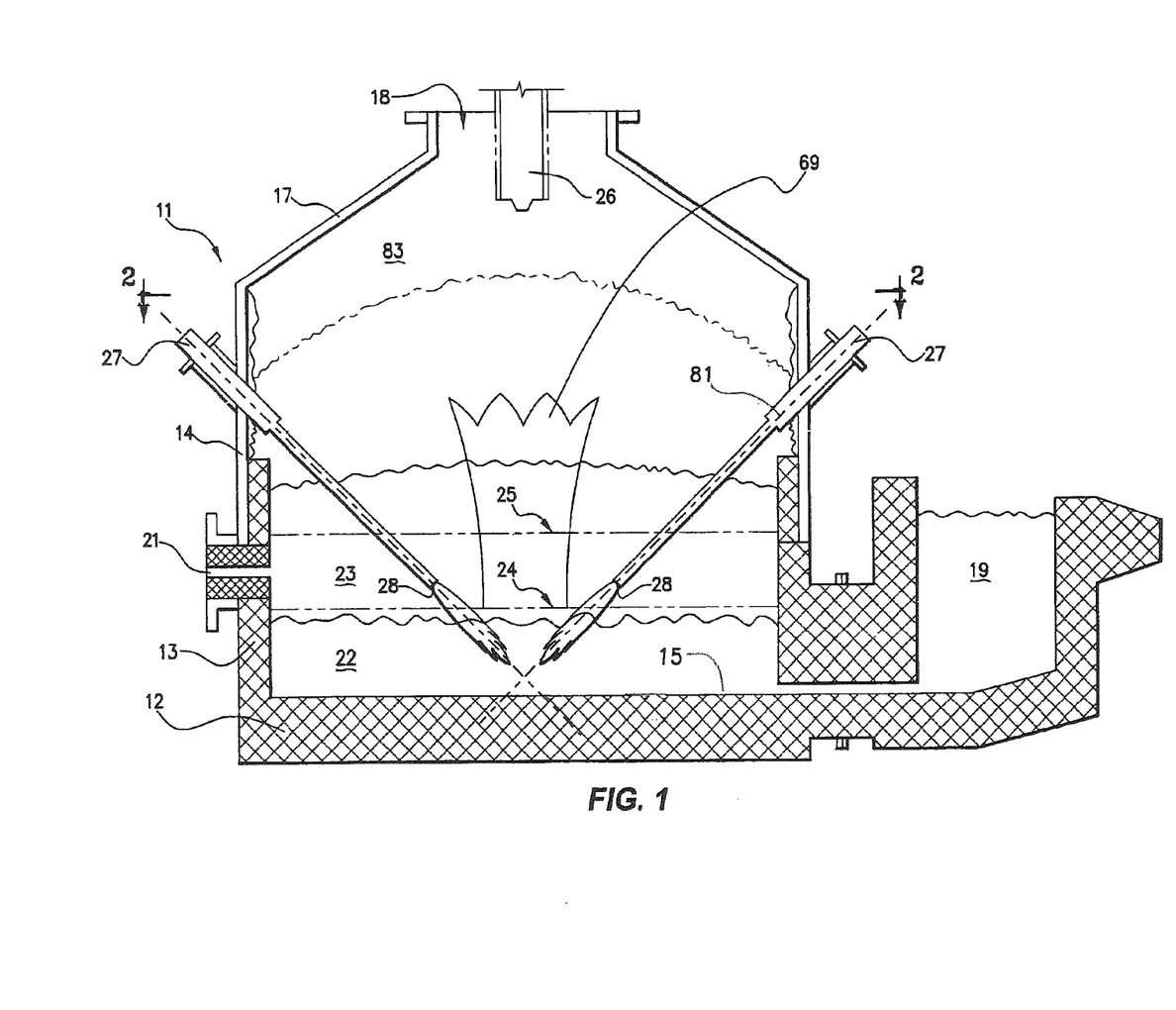
FIG. 1 is a vertical cross-section through one embodiment of a direct smelting vessel in accordance with the present invention.

FIG. 1 shows a direct smelting vessel 11 that forms a part of a plant that is suitable particularly to be used to carry out the HIsmelt process as described in International application PCT/AU96/00197. The subject process can be considered to be a form of the HIsmelt process as described in that International application.

The following description is in the context of smelting metalliferous material in the form of iron ore fines to produce molten iron in accordance with the HIsmelt process. However, it will be appreciated that the present invention is not confined to iron ore and is applicable to smelting any metalliferous material in any form of the material. Ore is one example of a form of metalliferous material. The invention also extends to other forms, including by way of example partly reduced ores and metal-containing waste streams.

The vessel 11 has a hearth for containing a molten bath of iron and slag that includes a base 12 and sides 13 formed from refractory bricks, a side wall 14, which forms a generally cylindrical barrel extending upwardly from the sides 13 of the hearth, and a roof 17. The side wall 14 and the roof 17 comprise water-cooled panels (not shown) for transferring heat from the side wall 14 and the roof 17. The water cooling of the panels is the main mechanism for controlling the temperature of the side wall 14 and the roof 17 and ensuring that the temperature does not increase to a level that has an impact on the integrity of the side wall 14 and the roof 17. The vessel 11 is further provided with a forehearth 19, through which molten iron is continuously discharged during smelting, and a tap-hole 21, through which molten slag is periodically discharged during smelting. The roof 17 is provided with an outlet 18 through which process off gases are discharged.

In use of the vessel 11 to smelt iron ore fines to produce molten iron in accordance with the process of the present invention, the vessel 11 contains a molten bath of iron and slag, which includes a layer 22 that is predominantly molten iron and a layer 23 that is predominantly molten slag on the iron layer 22. The position of a nominal quiescent surface of the iron layer 22 is indicated by arrow 24. The position of a nominal quiescent surface of the slag layer 23 is indicated by arrow 25. The term "quiescent surface" is understood to mean the surface when there is no injection of gas and solids into the vessel 11. Under normal operating conditions, the process operates in a range of pressures between 0.5 barg and 1.2 barg, and preferably between 0.6 to 1.0 barg.

The vessel 11 is provided with solids injection lances 27 that extend downwardly and inwardly through openings (not shown) in the side wall 14 of the vessel and into the slag layer 23.

The lances 27 are oriented within the vessel so that outlet ends 28 of the lances 27 are above the surface of the iron layer 22 during operation of the process. This position of the lances 27 reduces the risk of damage through contact with molten metal and also makes it possible to cool the lances by forced internal water cooling without significant risk of water coming into contact with the molten metal in the vessel 11.

In use, under normal operating conditions, solid feed materials in the form of iron ore fines, solid carbonaceous material (such as, for example, coal or coke breeze) and fluxes are co-injected through outlet ends 28 of the lances 27 into the molten bath with sufficient momentum and/or velocity to penetrate into the iron layer 22. The iron ore fines, solid carbonaceous material, and fluxes are entrained in an oxygen-deficient carrier gas, such as nitrogen. The coal is devolatilised and thereby produces gas. Carbon partially dissolves into the metal and partially remains as solid carbon. The iron ore is smelted to metal and the smelting reaction generates carbon monoxide gas. The gases transported into the iron layer 22 and generated via devolatilisation and smelting produce significant buoyancy uplift of molten material (including metal and slag) and solid carbon and gas from the molten bath. The buoyancy uplift generates an upward movement of splashes, droplets and streams of molten material and gas into an upper region 83, i.e. an upper gas space, of the vessel. The upper movement is shown in FIG. 1 as a region identified by the numeral 69. The buoyancy uplift also causes substantial agitation in the molten bath and, in effect, expands the molten bath. The extent of agitation is such that there is strong mixing of the molten material within the molten bath to the extent that there is reasonably uniform temperature—typically, 1450-1550° C. with a temperature variation of the order of 30° throughout the molten bath.

Figure 2:
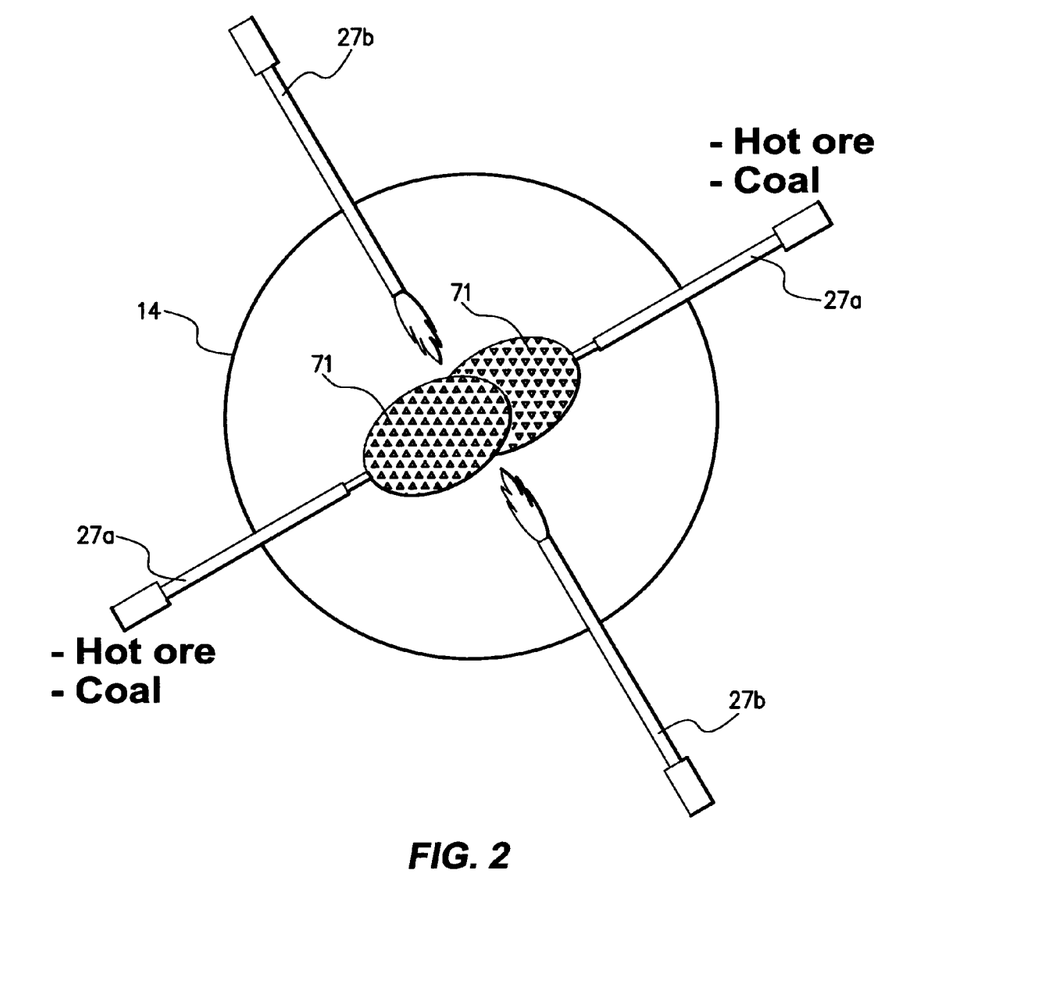
FIG. 2 is a cross-section along the line 2-2 in FIG. 1 that illustrates the overlapping plumes of injected material in accordance with one embodiment of a direct smelting process in accordance with the present invention.

With reference to FIG. 2, the lances 27 comprise one pair of diametrically opposed lances 27a that extend downwardly and inwardly through the side wall 14 of the vessel 11, typically at an angle of 45° to the vertical. As seen in FIG. 1, the lances 27a are oriented within the vessel 11 so that longitudinal axes 81 of the lances 27a intersect in the iron layer 22 within a top three quarters, preferably within a top half, of the iron layer 22, as measured from a floor 15 of the base 12 of the vessel 11, in a central region of the iron layer 22. In use, under normal operating conditions, plumes 71 of iron ore fines and solid carbonaceous material are injected via the lances 27a with sufficient momentum and/or sufficient velocity so that the ends of the plumes overlap in the central region of the iron layer 22 (i.e. the plumes may be said to intersect in the central region or alternatively the plumes may be said to coalesce in the central region).

The applicant believes that two overlapping plumes of iron ore fines and carbonaceous material generate more intense turbulence within a localised region of the bath than is the case where equivalent plumes are injected into the bath but do not overlap.

Each plume 71 from a lance 27a comprises a stream of (a) injected metalliferous material and solid carbonaceous material and (b) products produced as a result of such injection into the direct smelting vessel via the lance 27a. The products include, by way of example, volatiles released from the carbonaceous material and reaction products such as CO and $CO_2$ and $H_2O$. As indicated above, the injected materials and the products resulting from the injection cause a significant upward movement of molten material and solid carbon and gas from the central region of the metal layer 22 into the upper region 83 of the vessel 11. The upward movement of molten material and solid carbon and gas from the iron layer 22, by virtue of the concentration of injection and penetration into the iron layer 22, is sufficient to the wet water-cooled panels that form the side wall 14 and the roof 15 of the vessel 11 to minimise heat loss to an extent that heat loss through the panels is less than 3000 $kW/m^2$ of panel, more preferably less than 2000 $kW/m^2$ of panel and to cause substantial agitation. In addition, this upward movement of molten material and solid carbon and gas from the iron layer 22 causes substantial agitation in the molten bath and facilitates heat transfer for the upper region of the vessel 11 into the molten bath.

Typically, for a vessel 11 that has a hearth diameter of at least 5 m and produces at least 60 tonne/hour molten iron, the overlapping plumes 71 are at least 400 mm below the quiescent interface 24 between the iron layer 22 and the slag layer 23. Typically, with this size vessel and production rate, the overlapping plumes 71 are within 200 mm of a vertical centreline of the vessel.

With further reference to FIG. 2, the lances 27 also comprise a pair of diametrically opposed lances 27b extending downwardly and inwardly through the side wall 14 of the vessel 11, typically at an angle of 50° to the vertical. These lances 27b are provided to inject solid carbonaceous material into the vessel during start up of the process on during process perturbations that make such injection of carbonaceous material appropriate. During normal operating conditions of the process, injection of iron ore fines and solid carbonaceous material is via the lances 27a only.

The vessel 11 also has a gas injection lance 26 for delivering a hot air blast into the upper region of the vessel 11. The lance 26 extends downwardly through the roof 17 of the vessel 11 into the upper region of the vessel 11. In use, the lance 26 receives an oxygen-enriched hot air flow through a hot gas delivery duct (not shown), which extends from a hot gas supply station (also not shown).

Figure 3:
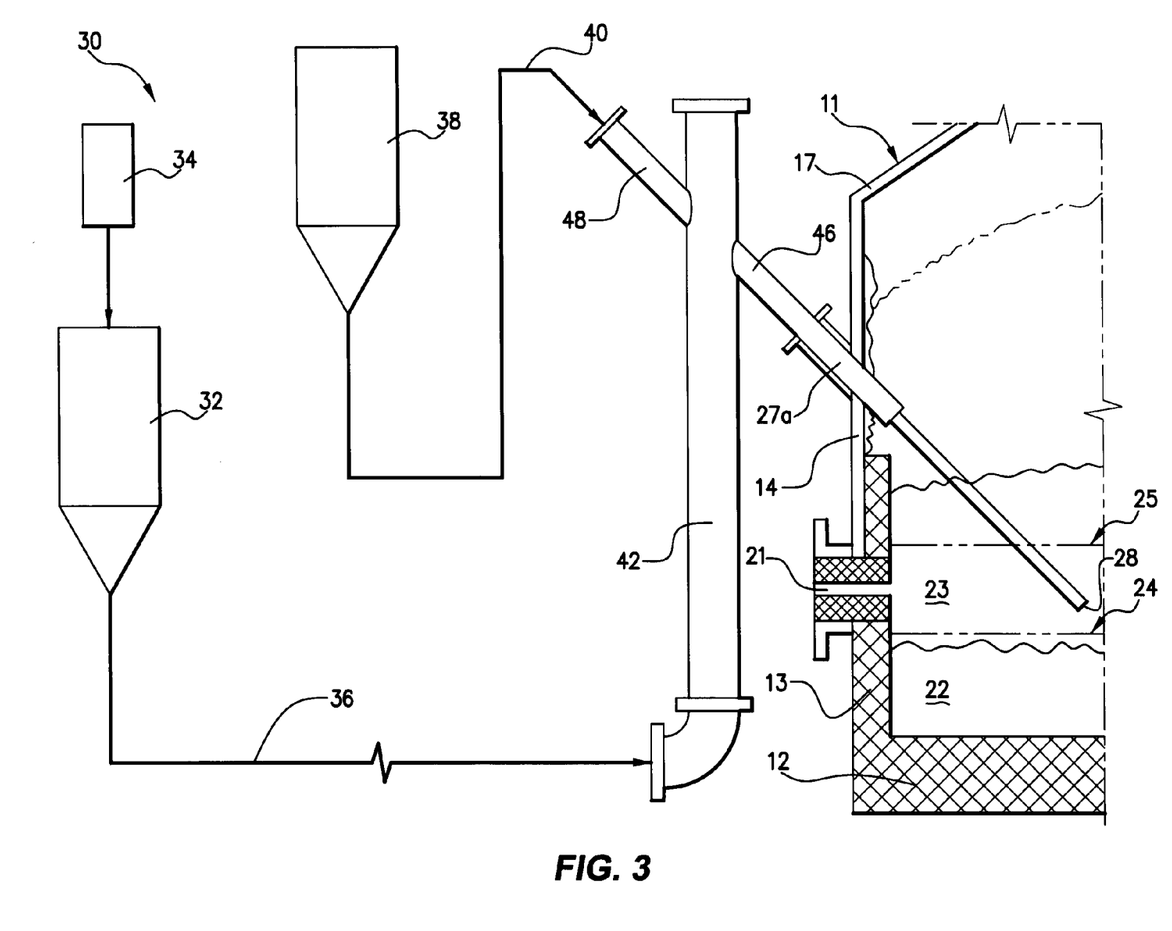
FIG. 3 is a schematic view that illustrates one embodiment of a direct smelting plant in accordance with the present invention.

FIG. 3 shows schematically one embodiment of a direct smelting plant in accordance with the present invention.

The plant includes the direct smelting vessel 11.

The plant also includes a pre-treatment unit 34 in the form of a pre-heater for heating iron ore fines.

The plant also includes an ore dispensing/metering unit 32 for dispensing heated iron ore fines from the pre-heater 34.

The ore dispensing/metering unit 32 is constructed to dispense heated iron ore fines with a carrier gas, which is typically nitrogen. The ore dispensing/metering unit 32 can be in the form of a plurality of bins that allow the heated iron ore fines to be transferred from standard atmospheric conditions to an environment of pressurized carrier gas. However, for the purposes of the present invention, the ore dispensing/metering unit 32 can be considered as a single unit.

In use, iron ore fines are fed to the pre-heater 34 from a stockpile (not shown) and the pre-heater heats the fines. The pre-heater 34 is arranged to heat the fines such that the iron ore fines are at a temperature of the order of 600° C. to 700° C. at the point of injection into the vessel 11. Off gases can be supplied from the outlet 18 to the pre-heater 34, such that heat can be transferred from the off gases to the iron ore fines. The pre-heater 34 is arranged to supply the heated iron ore fines to the ore dispensing/metering unit 32.

The plant also includes a material supply apparatus 30 for supplying heated iron ore fines and solid carbonaceous material (such as in the form of coal) to the lances 27a.

The material supply apparatus 30 includes a first supply line 36 for receiving heated iron ore fines from the ore dispensing/metering unit 32 and transporting the heated iron ore fines to one of the lances 27a. Accordingly, in use, iron ore fines are discharged from the ore dispensing/metering unit 32 into the supply line 36 and are transported to the lance 27a and injected into the vessel 11 via the lance 27a.

The material supply apparatus 30 also includes an assembly for supplying carbonaceous material to the first supply line 36 downstream of the ore dispensing/metering unit 32 and as close as possible to the lance 27a to facilitate co-injection of carbonaceous material and heated iron ore fines into the vessel 11. The assembly is in the form of a carbonaceous material dispensing assembly 38 which receives carbonaceous material from a stockpile (not shown) and a second supply line 40.

The carbonaceous material dispensing assembly 38 can be in the form of a plurality of bins that allow carbonaceous material to be transferred from standard atmospheric conditions to an environment of pressurized carrier gas. However, for the purposes of the present invention, the carbonaceous material dispensing assembly 38 can be considered to be a single unit.

The first supply line 36 is positioned approximately level with the base 12 of the vessel 11.

The supply line 36 includes an upwardly extending section 42, which conveys the heat iron ore fines from a position that is approximately level with the base 12 to at least the height of the inlet of the lance 27a.

The supply line 36 also includes a downwardly extending section 46 which connects the line to an inlet end of the lance 27a. The section 46 is formed to be co-axial with the lance 27a when in an operating position as shown in FIG. 3.

The supply line 36 also includes an upwardly extending section 48 that is co-axial with the section 46 and forms an inlet section for coal into the line 36.

The second supply line 40 is connected to section 48 of the supply line 36 and therefore is connected to the line as close to the inlet to the lance 27a.

In use, carbonaceous material at ambient temperature is discharged from the carbonaceous material dispensing assembly 38 into the second supply line 40 and then into the sections 48 and 46 of the first supply line 36 and mixes with the heated iron fines being transported in the line 36. The combined heated iron ore fines and carbonaceous material are subsequently transported via the section 46 of the supply line 36 to the inlet end of the lance 27 and are co-injected via the lance 27a into the vessel 11.

Thus, it can be seen that, in use, iron ore fines are heated in the pre-heater 34 to an elevated temperature. The iron ore fines are subsequently transported along the supply line 36 to the lance 27a. The carbonaceous material is injected into the supply line 36 with the heated iron ore fines as close as possible to the inlet of the lance 27a—with minimal risk of tar formation and undesirable reactions between the heated iron ore fines. The heated iron ore fines and carbonaceous material are transported to the inlet end of the lance 27a and then into the vessel 11.

The carbonaceous material may be injected into the supply line 36 with the heated iron ore fines at any location on the line 36 upstream of the location shown in FIG. 3 subject to the location being sufficiently close to the lance 27a so that there is minimal risk of tar formation and undesirable reactions between the heated iron ore fines. Typically, such a location can be described as being within 50% of the length of the supply line 36 from the inlet end of the lance 27a, with the length of the line being measured between the location and the inlet end of the lance 27a. Typically, such a location can also be described as being less than 0.5 seconds conveying time to the inlet end of the lance 27a.

Many modifications may be made to the embodiments described above without departing from the spirit and scope of the present invention.

By way of example, whilst the embodiment of the direct smelting vessel described above with reference to the Figures includes one pair of lances 27a, the present invention is not so limited and extends to arrangements that comprise two or more such pairs of lances 27a.

By way of further example, whilst the embodiment described above operates under pressure in the range of pressures between 0.5 barg and 1.2 barg, the present invention is not limited to this pressure range and moreover is not limited to operation under pressure and may operate at atmospheric pressure.

By way of further example, whilst the side wall 14 and the roof 17 of the embodiment described above comprise water-cooled panels, the present invention is not limited to the use of these panels. For example, the vessel walls and roof may be completely constructed from refractory material.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A molten bath-based process for direct smelting metalliferous material and producing molten metal in a direct smelting vessel having a vessel floor and an upper region, which process comprises injecting a solid metalliferous material and a solid carbonaceous material through at least one pair of opposed injection lances extending downwardly and inwardly into a molten bath in the direct smelting vessel with longitudinal axes of the lances in the pair of opposed lances intersecting within a top three quarters of a metal layer in the molten bath, as measured from the vessel floor, and selecting momentum and/or velocity of the injected material to penetrate the molten bath and to coalesce in the molten bath below a nominal interface of molten metal and molten slag in the molten bath under quiescent conditions, whereby plumes of injected material from the lances overlap in a central region of a metal layer in the molten bath and the metalliferous material at least substantially melts in the metal layer and there is upward movement of molten material and gas from the central region of the metal layer.

2. The process defined in claim 1 wherein the longitudinal axes of the lances intersect above the vessel floor.

3. The process defined in claim 1 wherein the metalliferous material and the carbonaceous material are pneumatically injected into the smelting vessel whereby the material is entrained in a carrier gas.

4. The process defined in claim 1, wherein the process melts at least 75% by weight of the metalliferous material injected via the lances before this material passes into a slag region of the molten bath.

5. The process defined in claim 1 comprising supplying at least 75% by weight of the metalliferous material and the carbonaceous material that is supplied to the direct smelting vessel during the process via the lances.

6. The process defined in claim 1 comprising operating in a range of pressures between 0.5 barg and 1.2 barg.

7. The process defined in claim 1 comprising injecting the metalliferous material and the carbonaceous material from the lances towards a vertical centreline of the direct smelting vessel.

8. The process defined in claim 1 wherein the upward movement of molten material and gas from the metal layer into the upper region of the vessel is sufficient to wet water-cooled panels that form a side wall and optionally a roof of the direct smelting vessel to an extent that heat loss through the panels is less than 3000 kW/m$^2$ of panel.

9. The process defined in claim 1 wherein the upward movement of molten material and gas from the metal layer into the upper region of the vessel is sufficient to cause substantial agitation in the molten bath and facilitate heat transfer from the upper region into the molten bath.

10. The process defined in claim 1 comprising injecting the carbonaceous material through at least one additional lance into the direct smelting vessel during the process.

11. The process defined in claim 1 comprising injecting at least 100 tonnes/hour iron ore and at least 60 tonnes/hour coal into the direct smelting vessel and producing at least 60 tonnes/hour molten iron.

12. The process defined in claim 1 comprising operating in a range of pressures between 0.6 to 1.0 barg.

13. The process defined in claim 1 wherein the upward movement of molten material and gas from the metal layer into the upper region of the vessel is sufficient to wet water-cooled panels that form a side wall and optionally a roof of the direct smelting vessel to an extent that heat loss through the panels is less than 2000 kW/m$^2$ of panel.

14. A molten bath-based process for direct smelting metalliferous material and producing molten metal in a direct smelting vessel having a vessel floor and an upper region, which process comprises pneumatically injecting a solid metalliferous material and a solid carbonaceous material through at least one pair of opposed injection lances extending downwardly and inwardly into a molten bath in the direct smelting vessel, longitudinal axes of the lances intersecting within a top three quarters of a metal layer in the molten bath, as measured from the vessel floor, and selecting momentum and/or the velocity of the injected material to penetrate the molten bath whereby plumes of pneumatically injected material from the lances coalesce in the molten bath below a nominal interface of molten metal and molten slag under quiescent conditions, thereby producing significant upward movement of molten material and gas from the metal layer of the molten bath.

15. The process defined in claim 14 wherein the momentum of the injected material is at least one selected from the group consisting of average momentum of gas, metalliferous material, and carbonaceous material forming the plumes.

* * * * *